(12) United States Patent
Schelte (10) Patent No.: US 12,074,730 B2
(45) Date of Patent: Aug. 27, 2024

(54) CONTROL- AND/OR MONITORING-SYSTEM FOR INDUSTRIAL ETHERNET APPLICATIONS AND A RESPECTIVE METHOD OF CONTROL AND MONITORING AN INDUSTRIAL ETHERNET DEVICE

(71) Applicant: TURCK Holding GmbH, Halver (DE)

(72) Inventor: Benjamin Schelte, Hemer (DE)

(73) Assignee: TURCK Holding GmbH, Halver (DE)

( * ) Notice: Subject to any disclaimer, the term of this patent is extended or adjusted under 35 U.S.C. 154(b) by 0 days.

(21) Appl. No.: 18/149,864

(22) Filed: Jan. 4, 2023

(65) Prior Publication Data
US 2023/0216707 A1 Jul. 6, 2023

(30) Foreign Application Priority Data
Jan. 5, 2022 (EP) .................................... 22150325

(51) Int. Cl.
*H04L 12/46* (2006.01)
*G05B 19/418* (2006.01)
(Continued)

(52) U.S. Cl.
CPC .... *H04L 12/4633* (2013.01); *G05B 19/41855* (2013.01); *H04L 47/30* (2013.01); *H04L 63/0236* (2013.01); *G05B 2219/25174* (2013.01)

(58) Field of Classification Search
CPC . H04L 12/4633; H04L 47/30; H04L 63/0236; G05B 19/41855; G05B 2219/25174
See application file for complete search history.

(56) References Cited

U.S. PATENT DOCUMENTS 8,423,511 B1 * 4/2013 Bhatia ................. G06F 11/1464
707/654
11,082,413 B2 * 8/2021 Cammisa ............ H04L 63/0471
(Continued)

FOREIGN PATENT DOCUMENTS

EP 2287690 A1 2/2011

OTHER PUBLICATIONS

Durkop et al., "An Analysis of Real-Time Ethernets With Regard to Their Automatic Configuration", 2015.*
(Continued)

*Primary Examiner* — Todd L Barker
(74) *Attorney, Agent, or Firm* — Kowert, Hood, Munyon, Rankin & Goetzel, P.C.; Gentry C. McLean; Dean M. Munyon (57) ABSTRACT

A control and/or monitoring system is disclosed. In an embodiment, the system includes a host device on which an application for generating an Ethernet frame for deriving information about an industrial Ethernet network can be run and an industrial Ethernet tunnel device which is adapted to communicate with the host device. The system is configured to inject the Ethernet frame for deriving an information about an industrial Ethernet network and/or about one or more of the industrial Ethernet devices through the industrial Ethernet tunnel device and to receive an answer in an Ethernet frame format in the host device. An industrial Ethernet tunnel device and a method for control and/or monitoring of one or more devices in an industrial Ethernet network are also disclosed.

20 Claims, 5 Drawing Sheets

(51) Int. Cl.
*H04L 9/40* (2022.01)
*H04L 47/30* (2022.01)

(56) References Cited

U.S. PATENT DOCUMENTS

| | | | |
|---|---|---|---|
| 11,677,585 B2* | 6/2023 | Ponaka | H04L 12/4633 |
| | | | 370/254 |
| 2006/0209807 A1* | 9/2006 | Lor | H04L 47/2458 |
| | | | 370/395.3 |
| 2012/0246376 A1 | 9/2012 | Kolblin et al. | |
| 2016/0044085 A1* | 2/2016 | Lessmann | H04L 67/025 |
| | | | 709/203 |
| 2018/0375970 A1* | 12/2018 | Xue | H04L 69/324 |
| 2021/0026792 A1 | 1/2021 | Buttner et al. | |
| 2021/0081346 A1* | 3/2021 | Nixon | H04L 69/18 |
| 2021/0336930 A1* | 10/2021 | Vessels | H04W 76/15 |
| 2021/0382462 A1* | 12/2021 | Rácz | H04L 67/12 |
| 2021/0385188 A1* | 12/2021 | Puleri | H04W 28/0289 |
| 2021/0392011 A1* | 12/2021 | Mutter | H04L 12/40143 |
| 2022/0321493 A1* | 10/2022 | Rollet | H04L 47/24 |
| 2022/0417218 A1* | 12/2022 | Purta | H04L 63/029 |
| 2023/0049690 A1* | 2/2023 | Ponaka | H04L 12/4641 |
| 2023/0171727 A1* | 6/2023 | Kanamarlapudi | G01V 1/50 |
| | | | 370/350 |
| 2023/0300666 A1* | 9/2023 | Rost | H04W 40/24 |
| | | | 370/329 |

OTHER PUBLICATIONS

Treytl et al., "Security Measurers for indusrial fieldbus systems-state of the art and solutions for IP-based approaches", IEEE International Workshop on Factory Communication Sysems, Sep. 22, 2004.*

Hohmann et al., "Bridge Me If You Can! Evaluating the Latency of Securing Profinet", 2021 International Conference on Information Networking (ICOIN), Jan. 13, 2021.*

Extended European Search Report in EP Appl. No. 22150325.3 mailed Jun. 21, 2022, 7 pages.

Office Action in European Appl. No. 22150325.3 mailed Apr. 24, 2024, 4 pages.

* cited by examiner

CONTROL- AND/OR MONITORING-SYSTEM FOR INDUSTRIAL ETHERNET APPLICATIONS AND A RESPECTIVE METHOD OF CONTROL AND MONITORING AN INDUSTRIAL ETHERNET DEVICE

CROSS-REFERENCE TO RELATED APPLICATIONS

The present application claims priority under 35 U.S.C. § 119 to European Patent Application No. EP22150325.3, filed Jan. 5, 2022, the disclosure of which is incorporated by reference herein in its entirety.

TECHNICAL FIELD

This disclosure relates to networked information systems, and particularly to control and monitoring in industrial Ethernet networks.

DESCRIPTION OF RELATED ART

The use of Ethernet in an industrial environment with protocols that provide determinism and real-time control is commonly known as industrial Ethernet.

Industrial Ethernet is a further development of Ethernet. The aim here is to apply the possibilities of Ethernet to devices involved in industrial production and control (also called real-time Ethernet). In general, the devices for controlling and monitoring production processes are integrated into the usually already existing LAN network of the employees' computers.

Protocols for industrial Ethernet may include EtherCAT, EtherNet/IP, PROFINET, POWERLINK, SERCOS III, CC-Link IE, and Modbus TCP. Many industrial Ethernet protocols use a modified Media Access Control (MAC) layer to provide low latency and determinism.

Some industrial networks emphasized deterministic delivery of transmitted data, whereas Ethernet used collision detection which made transport time for individual data packets difficult to estimate with increasing network traffic. Typically, industrial uses of Ethernet employ full-duplex standards and other methods so that collisions do not unacceptably influence transmission times.

For performing control and diagnosing functions in industrial Ethernet, several software and hardware providers are known which provide the respective equipment.

For example, a software called "PROscan" from Indusol is used to determine e.g. topologies of the industrial Ethernet network or for executing controlling functions.

Figure 6:
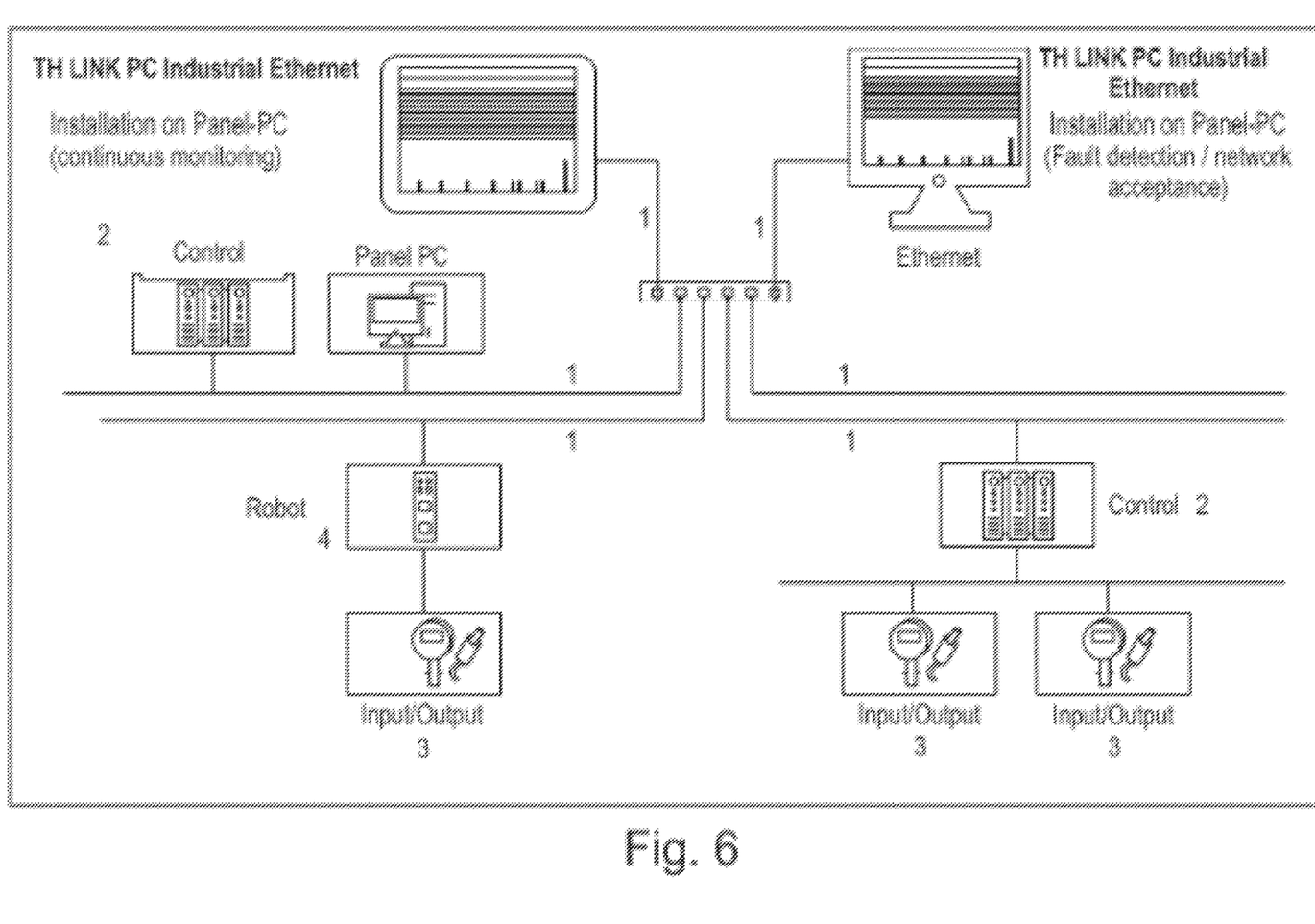
FIG. 6 is a block diagram illustrating a prior art situation, wherein the TH LINK software is used to control and monitor the industrial Ethernet network.

A further prior art example is shown in FIG. 6. In said example, it is shown a setup of the also commonly used TH LINK PC industrial Ethernet software product (from Softing Industrial Automation GmbH). Said software enables maintenance personnel and plant operators to perform powerful diagnostics of industrial networks. It collects diagnostic data in networks with up to 254 nodes and makes them available to the user via TH SCOPE. TH LINK PC industrial Ethernet is suitable for temporary and permanent measurement applications and supports the PROFINET, EtherNet/IP and Modbus TCP protocol.

As shown in FIG. 6 in the industrial Ethernet network, via network cables 1, the sensors or actuators (e.g. Input/Output, reference sign 3) are controlled and monitored. In said Figure, there is also shown with reference sign 4 a robot having an input and/or output device which is controlled and/or monitored via the network.

The controlling and/or monitoring can be done by the personal computer which is connected to the network. In the example of FIG. 6, there is one PC on which the TH LINK software is executed which is used for fault detection and/or determining the network acceptance. There is also a second PC on which the TH LINK software is executed for continuous controlling the devices in the network.

Any software and in particular the TH LINK software is costly. The different industrial Ethernet networks may have different protocols and therefore, it is difficult to use a different software for control and to use also devices to be connected to the industrial Ethernet network which does not match with the protocol of the network.

Further, due to security reasons, it is difficult to connect such an industrial Ethernet network to the company's network on which the other working PC's or the ERP System is running.

SUMMARY OF DISCLOSED EMBODIMENTS

The disclosed embodiments solve this drawback and include an inventive control and monitoring system and method.

Generally spoken, it can be used an external application which is suitable for generating one or more specific Ethernet frames. These Ethernet frames contain data for deriving an information about an industrial Ethernet network and/or about one or more industrial Ethernet devices which are provided within the industrial Ethernet network (in the following it is referred for the sake of simplicity only to "Ethernet frames which contain data for deriving an information about an industrial Ethernet network"). These Ethernet frames are tunneled via an industrial Ethernet tunnel device to the industrial Ethernet network to derive the respective information, then the answer is sent by the industrial Ethernet tunnel device again back such that it can be derived by the application or a different application on a host device.

With said structure of such a system, there is no limitation concerning a specific software. The respective control and monitoring can also be made remotely, that means not on the location of the industrial Ethernet devices. It can be for example made in a different facility, for example, on a different continent or country than the devices to be controlled or from which information should be derived.

Figure 5:
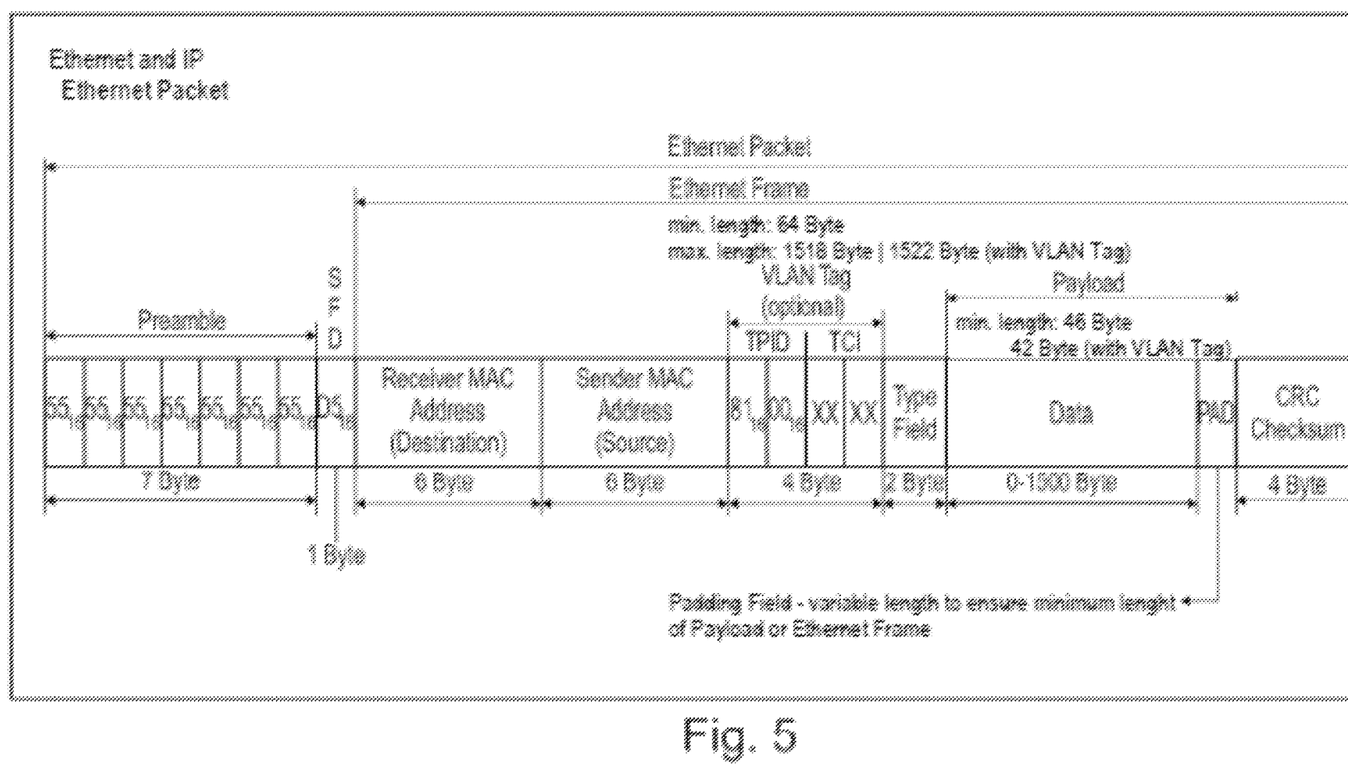
FIG. 5 illustrates a configuration of a conventional Ethernet packet.

A general setup of an Ethernet packet containing an Ethernet frame is shown in FIG. 5. Such an Ethernet frame contains different sections of bits. There is for example one frame section containing the destination address (in the example of FIG. 6, 6 bytes) and one frame section containing the source address. The data is contained in the data frame. Further, in such an Ethernet frame, there is contained a sequence with a check sum. However, such an Ethernet frame format is generally known.

Via such format, the respective data can be transferred.

According to the disclosed embodiments with the respective application, it can be set up one or more of respective Ethernet frames which are to be tunneled through the industrial Ethernet tunnel device into the industrial Ethernet network.

The respective data field thus comprises data concerning the information which are desired to be obtained by the user. This Ethernet frame, which is set up (e.g. programmed) by the user in the respective application is then transmitted into the industrial Ethernet network and an answer is then later transmitted back to the application.

The respective system may have a host device on which the application for generating an Ethernet frame for deriving information of an industrial Ethernet frame can be run, an industrial Ethernet tunnel device and an industrial Ethernet network. Within the industrial Ethernet network, one or more devices (with which data is exchanged via the industrial Ethernet network) are provided. Such device may be a sensor and/or an actuator which measures data of the device or the working environment and/or which performs any other actuation e.g. to work on a product.

In particular, the inventive system is characterized by being configured to inject the one or more Ethernet frame for deriving information about an industrial Ethernet network and/or about one or more of the industrial Ethernet devices, through the industrial Ethernet tunnel device and to receive an answer in an Ethernet frame format in the host device which answer is transmitted through the industrial Ethernet tunnel device.

According to a further development, the application may be configured in that it is further established with the application a filtering rule in the industrial Ethernet tunnel device. This filtering rule may be stored or temporarily in the industrial Ethernet tunnel device. Said filtering rule should e.g. only filter out those Ethernet frames or information which can give the answer in an Ethernet format to the information requested by the application.

However, the remaining Ethernet frames which are not related to the answer are preferably not transmitted from the industrial Ethernet tunnel device to the host device and thus remain in the industrial Ethernet network. Said configuration provides an enhanced security.

Such a filtering rule can be an EtherType filter which filters out different types of Ethernet frames which are allowed to be transmitted to the application and/or the host device, an EtherType filter, which filters the data with respect to the EtherType used, a MAC-address filter which filters out only data from respective devices in the industrial Ethernet network having a corresponding MAC address; an IP address filter which filters out only the respective Ethernet frames having a respective IP address, or an IP address range filter which sets an IP address range from which the Ethernet frames related thereto are filtered out. Also some or all of the aforementioned filtering rules can be combined as one filtering rule. Thus any combination of one or more of the aforementioned filtering rules is possible.

It may be further the case that via the application, the filtering rule is again deleted in the industrial Ethernet tunnel device when the communication between the application and the industrial Ethernet tunnel device is to be disconnected again. It may be also the case that the industrial Ethernet tunnel device is configured to delete the filtering rules after disconnecting from the application/host device and after it has transmitted the requested answer for example via a cloud to the host device.

In particular, the disclosed embodiments provide an application and/or a host device which is provided externally from the industrial Ethernet network. It may be the case that the host device or the application is connected to the industrial Ethernet network via a cloud, a network of the entity being not the industrial network (e.g. the ERP network of the company) or the World Wide Web. With such a configuration, it may be provided a tunnel via the usual IT network of the company.

Further, it may be the case that the respective control and monitoring may be executed remotely from the devices of the industrial Ethernet network, e.g. in a different facility, for example on a different continent or in a different country.

According to a further development, the industrial Ethernet tunnel device may also comprise an internal application. This internal application is configured to use the Ethernet frame for deriving information about an industrial network which is derived from the application and may translate the received format to the Ethernet frame format which is used in the industrial Ethernet network.

Further, this application may be configured to use the respective Ethernet frame format in the industrial Ethernet network and translate it back to the Ethernet format from which it was generated in the application.

Further additionally or alternatively, the industrial Ethernet tunnel device may comprise a buffer storage in which the Ethernet frame for deriving information about the industrial Ethernet frame which is derived from the application is stored or temporarily stored. The internal application of the industrial Ethernet tunnel device transmits the respective data stored in the buffer storage based on the first-in first-out basis to the Ethernet network as soon as there is a feasible time slot.

Thus, the industrial Ethernet tunnel device manages the injection of the Ethernet frame or frames generated in the application and manages also to send back the respective answer frame or frames to the application.

According to a further development, the application may be a web-based application which can be run on a host device via a browser.

With such a configuration, a connection to the industrial Ethernet tunnel device can be set up very easily without the need of any special software on the host device.

For generating the Ethernet frames for deriving an information about an industrial Ethernet network, it may be used any software, for example a Linux software with which it is very easy to generate in a programming language said Ethernet frames. These Ethernet frames are then tunneled for example after a respective password is entered or after a respective identification is executed to the industrial Ethernet tunnel device.

A thus certified user may then derive the information from the system after the respective information is requested via tunneling. If the user has some basic programming abilities, he can get from remote via the industrial Ethernet tunnel device access to the industrial Ethernet network without any huge effort as long as the security rules are regarded and he enters e.g. a respective password asked from the industrial Ethernet tunnel device.

According to a further development, the industrial Ethernet tunnel device may not need more than two ports for being integrated between the host device and the industrial Ethernet network. This means, the industrial Ethernet network may be coupled via only one port to the industrial Ethernet tunnel device. The industrial Ethernet tunnel device provides one external interface (port) to the application and the application can tunnel via one port through the industrial Ethernet tunnel device. The industrial Ethernet tunnel device can have a housing which e.g. can be mounted in a standard industrial rack.

The industrial Ethernet tunnel device may be coupled to and may communicate with the application via a wireless communication protocol or may use a LAN cable.

According to a further development of the invention, the respective information requested and the answer may be related to the following:

The information may be related to deriving information of the topology of the industrial Ethernet network, this means the location and connection of the respective devices within the industrial Ethernet network.

The information may be related to registration of a new device in the industrial Ethernet network. In order to do so, there is sent in the Ethernet frame an instruction to register a specific device and when the device is registered, it is answered back that the registering was successful.

The information may be related to a process control made with the respective device in the industrial Ethernet network.

The information may also be related to the necessity of maintenance or it can be searched for faults or it can be transmitted information about faults.

However, said interaction may be visualized on the host device to be visible for a user. This visualization may be done on a screen, where at least the respective requested information is visualized.

According to a further development, the application may be a JAVAscript based application. Such a JAVAscript based application is easy to be programmed. However, the present invention is not limited to said JAVAscript based application and it can be used any other known script format for the application.

Further, the Ethernet frame for deriving information about the Ethernet network has a raw Ethernet format and/or the answer has a raw Ethernet format. A "raw ethernet frame" injection means the freedom of the host application to inject any kind of ethernet frame to the network. That means the host application is not limited to standard protocol formats like UDP or TCP/IP, but can assemble any other existing protocol frame format manually by generating this kind of "raw ethernet frame" format within the host application itself. Usually a Windows or even Linux driven application is able to inject packets in well defined and wide spread frame formats like UDP or TCP/IP. i.e. the application relies on predefined stacks.

Further to the aforementioned system, there is also provided a respective method for controlling and monitoring the one or more devices in the industrial Ethernet network via the application. The aforementioned system-related features may thus also be formulated as method-related features.

However, the invention is not limited to the combination of the aforementioned features. Each of the aforementioned features can form its own invention. The system does not need to have the host device. The tunnel device with its respective configuration can also form its own invention.

BRIEF DESCRIPTION OF THE DRAWINGS

In the following, the disclosed embodiments shall be described with respect to the Figures, in which.

DETAILED DESCRIPTION

With reference to FIGS. 1 to 4, a first configuration of the disclosed system shall be described.

However, the disclosed embodiments are not limited to said system and can be embodied in varied forms. The scope of protection is defined by the claims.

Figure 1:
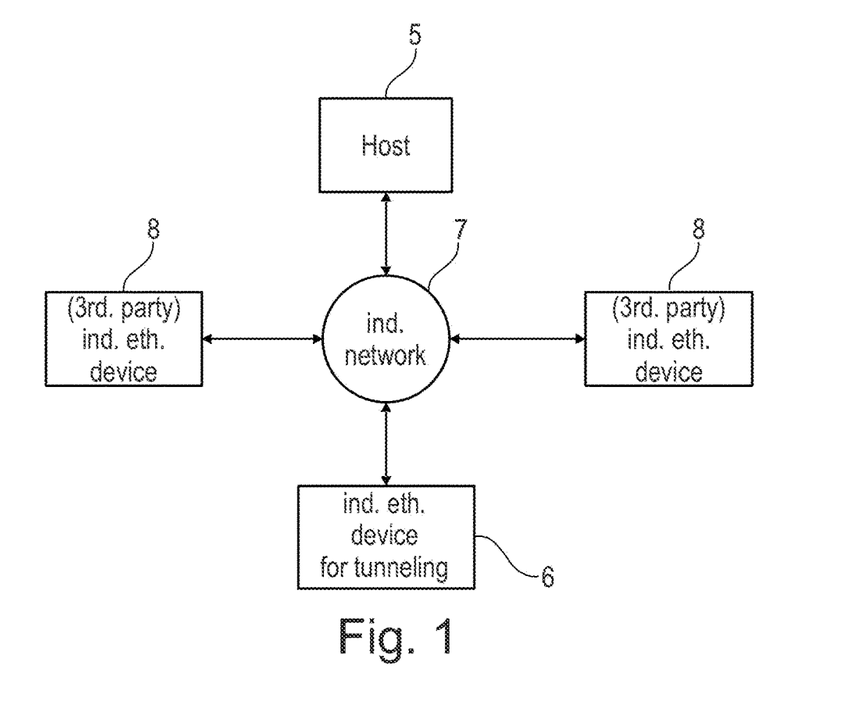
FIG. 1 is a block diagram illustrating a general scheme of a topology how a host device and industrial Ethernet devices interact with an industrial Ethernet network.

Generally, FIG. 1 shows a general scheme of a respective system.

Via an industrial Ethernet network 7, a host device 5 can communicate with an industrial Ethernet tunnel device 6 and derive information from industrial Ethernet devices 8. The respective overview in FIG. 1 does not show the specific topology, it shows just a general interaction of the respective elements.

Figure 2:
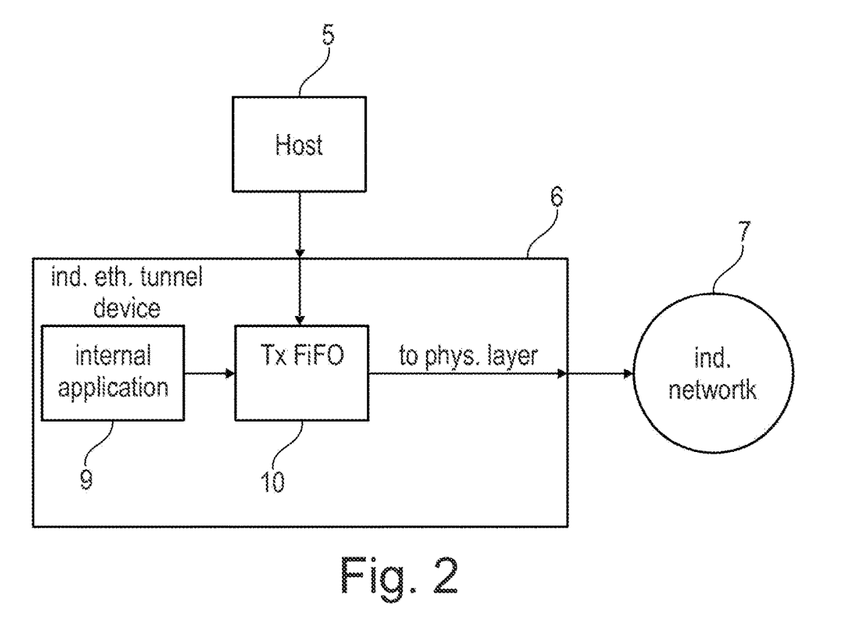
FIG. 2 is a block diagram illustrating connection of the host device via the industrial Ethernet tunnel device to the industrial Ethernet network in a situation in which the frame or frames containing the information are sent from the host device to the industrial Ethernet network.
Figure 3:
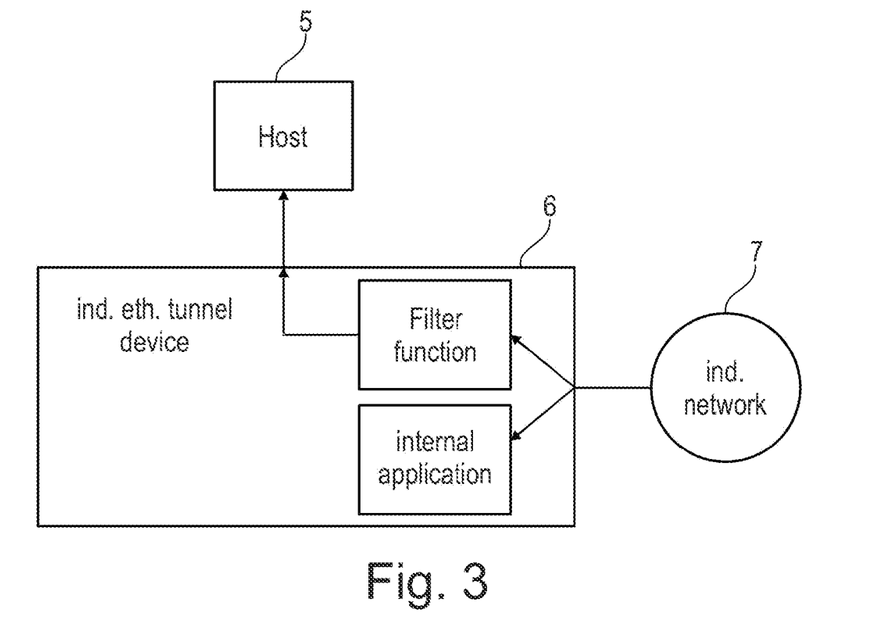
FIG. 3 is a block diagram illustrating a situation wherein the respective answer form the industrial Ethernet network is transferred via the industrial Ethernet tunnel device to the host.
Figure 4:
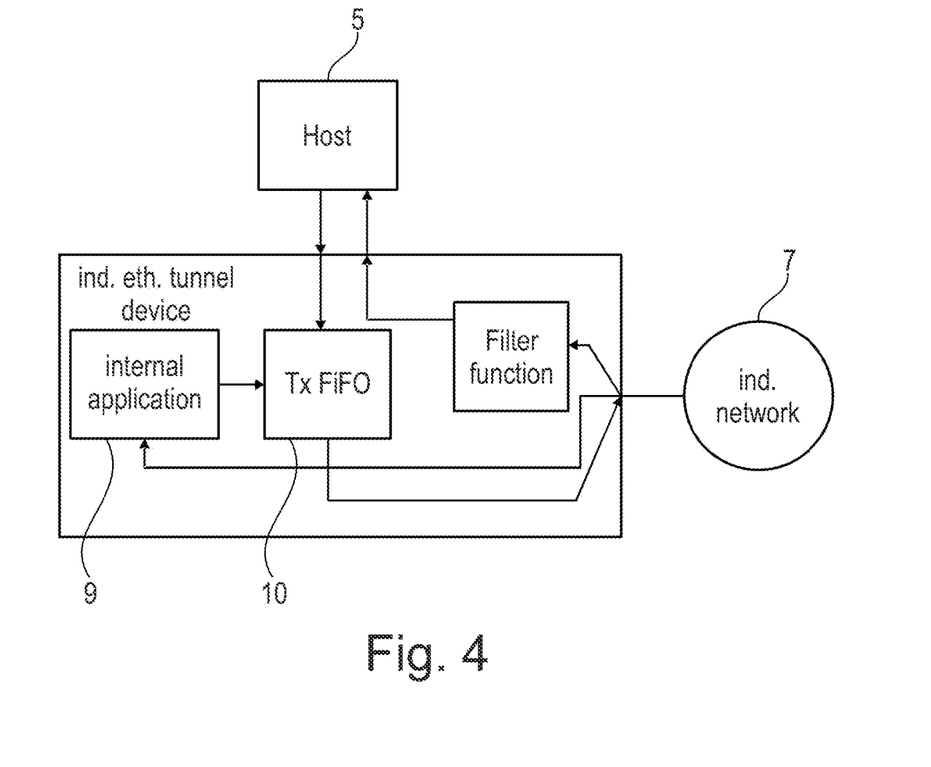
FIG. 4 is a block diagram illustrating a combined situation of the data transfer between the host device and the industrial Ethernet network.

How the respective topology for sending data (Ethernet frames) may look like can be derived from FIGS. 2 to 4.

In particular, in FIG. 2 on the host device 5 an application is run. This may be a web-based application, which is executed on the host device via a web browser.

With this application, an Ethernet frame may be constructed which is sent to the industrial Ethernet tunnel device 6. For doing so, it is necessary that the host device 5 (or application) established a communication to the industrial Ethernet tunnel device 6. This can be done by conventional measures. However, to establish a specific security, an encrypted communication can be established. The user may use a password in order to have access to the industrial Ethernet tunnel device 6.

From the industrial Ethernet tunnel device 6, the respective frames are injected to the industrial Ethernet network 7.

The industrial Ethernet tunnel device 6 has in the specific case an internal application 9 stored thereon (e.g., in a memory in the form of program instructions that are executable by a processor) and a buffer storage 10. In the specific case, the buffer storage 10 is the FIFO storage (first in first out storage).

The internal application 9 in the specific case decides when the respective Ethernet frames saved in the buffer storage 10 are to be injected into the industrial Ethernet network 7. This is done when there is a time slot available.

Thereafter, the respective frames may be used for communicating with the respective industrial Ethernet devices 8 and there may be sent back an answer which is received in the industrial Ethernet tunnel device 6 as shown in FIG. 3.

The industrial Ethernet tunnel device may establish a filter function (which may also be stored in a memory in the form of program instructions that are executable by a processor) in which a respective one Ethernet frame which is to be transferred to the host device can be filtered out. Such a filter may be an Ethernet-type filter, an EtherType filter, a MAC address filter, an IP address filter or an IP address range filter. The filter may be set up via the application. Also some or all of the aforementioned filtering rules can be combined as one filtering rule. Thus any combination of one or more of the aforementioned filtering rules is possible.

The removal of this filter function form the industrial Ethernet tunnel device may be done during or after the disconnection after the frames are exchanged.

How the specific interaction in the inventive system works is summarized in FIG. 4.

On the host device via the application, one or more Ethernet frames are set up. The Ethernet frame is transferred to the industrial Ethernet tunnel device 6 and there it is stored in the buffer storage 10. The internal application on the industrial Ethernet tunnel device decides when there is a time slot to inject said frame into the industrial Ethernet network 7.

From the industrial Ethernet tunnel device 6 by a filter function, the respective frames requested by the host device 5 can be extracted. The non-extracted Ethernet frames can for example be handled in the internal application 9. After the respective information is sent to the host device 5, the filter can be deleted. This deletion can be done by the application or by the internal application of the industrial Ethernet tunnel device.

The respective host device can be provided remotely and can communicate for example via wireless communication or via the World Wide Web with the industrial Ethernet tunnel device. The host device may be provided in a network system in the company which is different from the industrial Ethernet network.

Figure 7:
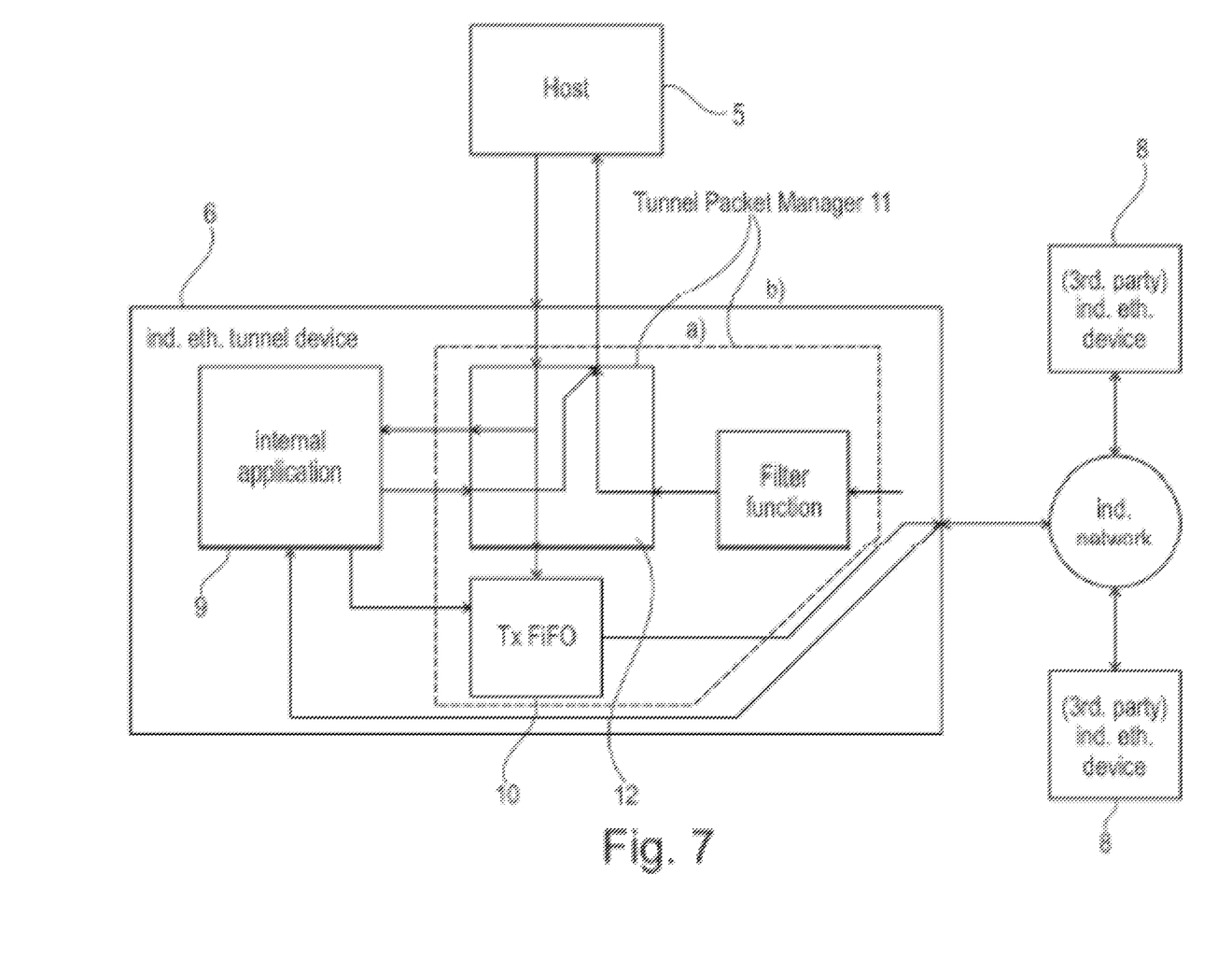
FIG. 7 is a block diagram illustrating a further variant of a disclosed system including the industrial Ethernet tunnel device.

FIG. 7 shows a further variant of the inventive system including the industrial Ethernet tunnel device 6. Further to the variant of the system shown in FIG. 4, the industrial Ethernet tunnel device 6 used in the system shown in FIG. 6 has a Tunnel Packet Manager 11.

Said Tunnel Packet Manager 11 can be the unit identified by the line b) in FIG. 7 or may be a unit identified by the line a) in FIG. 7.

The "Tunnel Packet Manager" according to line b) is set up by the TX FIFO (buffer storage 10), the filter function and a function called "Internal Routing Handler" 12 handling the internal routing of the host application ethernet frames to the internal application 9. All the aforementioned three block blocks may be required to fulfil the needs of a full fledged industrial network tunnel device.

The "tunnel packet manager" according to line a) is set up only the Packet Manager itself, which is constituted by the box in FIG. 7, which is in the variant according to line b) the called "Internal Routing Handler" 12. Tunnel packet manager 11 and internal routing handler 12 may be stored in a memory of the industrial Ethernet tunnel device in the form of program instructions that are executable by a processor.

The system in FIG. 7 has the same functionality as the system in FIG. 4 and additionally the following functions.

As the tunnel device itself might be a part of the whole industrial network setup (e.g. a PROFINET IO device or Ethernet IP device) it shall be possible to process the same ethernet frames from the host application and to send a response. Therefore the industrial Ethernet tunnel device 6 is extended by the possibility not only to forward the ethernet frame from the host application to the industrial network, but also forward it to the tunnel devices internal application 9 as well for processing.

The industrial Ethernet tunnel device 6 itself generates a response to the frame from the host application and returns it to the "packet manager", which forwards the packet back to the host application then.

The direction of the arrows in FIG. 7 show the direction of data exchange. From the host device 5, the Ethernet frame is injected to the packet manager and from there to the internal application and the buffer storage 10 respectively. Later after filtering out the Ethernet frames of interest in the filter function, the respective packet manager may combine the filtered frames with frames from introduced thereto from the internal application 9 and sent said frames back to the host device 5.

The present invention is also not limited to the complete system described with reference to the figures. It can also be provided a respective industrial Ethernet tunnel device 6 as such. It may also be provided an application as such, having the aforementioned functionalities in particular a web based application.

Although the term "an information", "the information" is used throughout the description, said term can be one piece of information or a plurality of pieces of information.

REFERENCE SIGNS

1 network cables
2 control
3 sensors
4 robot
5 host device
6 Industrial Ethernet tunnel device
7 Industrial Ethernet network
8 Industrial Ethernet device
9 internal application
10 buffer storage
11 Tunnel Packet Manager
12 Internal Routing Handler

What is claimed is:

1. A control and/or monitoring system, the system comprising:
    a host device on which an application, for generating a requesting Ethernet frame, in a first Ethernet frame format, for deriving information about an industrial Ethernet network or about one or more industrial Ethernet devices connected to the industrial Ethernet network, can be run; and
    an industrial Ethernet tunnel device which is adapted to communicate with the host device, wherein the system is configured to:
        inject the requesting Ethernet frame through the industrial Ethernet tunnel device; and
        receive an answer in the first Ethernet frame format in the host device, which answer is transmitted through the industrial Ethernet tunnel device;
    wherein the application is executable to establish a filtering rule in the industrial Ethernet tunnel device which filters out from Ethernet frames transmitted within the industrial Ethernet network an answering Ethernet frame which corresponds to the answer which is to be received in the host device, while the remaining Ethernet frames which are not related to the answer are not transmitted from the industrial Ethernet tunnel device to the host device.

2. The system according to claim 1, wherein the application is executable to cause the filtering rule to be deleted in the industrial Ethernet tunnel device when a communication between the application and the industrial Ethernet tunnel device is to be disconnected or terminated.

3. The system according to claim 1, further comprising the industrial Ethernet network and the one or more industrial Ethernet devices.

4. The system according to claim 1, wherein the host device or the application is connected to the industrial Ethernet tunnel device via a cloud, a network of an entity other than that of the industrial Ethernet network, or the World Wide Web.

5. The system according to claim 1, wherein the industrial Ethernet tunnel device comprises a memory storing program instructions executable by a processor to implement an internal application executable to use the requesting Ethernet frame for deriving information about the industrial Ethernet network or about one or more of the industrial Ethernet devices and to translate the requesting Ethernet frame to a second Ethernet frame format used by the industrial Ethernet network, and is further executable to use an answering Ethernet frame from the industrial Ethernet network which corresponds to the answer and translate it to the first Ethernet frame format which was generated in the application.

6. The system according to claim 1, wherein the application is a web based application which can be run on the host device via a web browser.

7. The system according to claim 1, wherein the requesting Ethernet frame for deriving information and the answer are related to one or more of:
deriving information of a topology of the industrial Ethernet network, process control via devices in the industrial Ethernet network, maintenance of the industrial Ethernet network, searching for faults in the industrial Ethernet network.

8. The system according to claim 1, wherein the system is configured to display the answer on the host device to be visible for a user.

9. The system according to claim 1, wherein the system is configured such that a connection between the application and the industrial Ethernet network via the industrial Ethernet tunnel device is allowed only if a connection between the host device and the industrial Ethernet tunnel device is a secure or trusted connection.

10. An industrial Ethernet tunnel device comprising:
one or more ports adapted to:
communicate with a host device on which an application for generating a requesting Ethernet frame for deriving information about an industrial Ethernet network or about one or more industrial Ethernet devices can be run; and
couple to an industrial Ethernet network adapted to transfer Ethernet frames between industrial Ethernet devices connected to the industrial Ethernet network; and
a memory storing program instructions executable by a processor to implement an internal application, wherein the internal application is executable to:
receive from the host device the requesting Ethernet frame for deriving information about the industrial Ethernet network or about one or more of the industrial Ethernet devices; and
transmit an answer in an Ethernet frame format to the host device;
wherein the application is executable to establish a filtering rule in the industrial Ethernet tunnel device which filters out from the Ethernet frames transmitted within the industrial Ethernet network an answering Ethernet frame which corresponds to the answer which is to be received in the host device, while the remaining Ethernet frames which are not related to the answer are not transmitted from the industrial Ethernet tunnel device to the host device.

11. The device of claim 10, further comprising a buffer storage for storing the requesting Ethernet frame, and wherein the internal application is executable to transmit data stored in the buffer storage based on a first-in-first-out basis to the industrial Ethernet network as soon as there is a feasible timeslot.

12. The device of claim 10, further comprising a memory storing program instructions executable by a processor to implement a filter function for filtering out, from Ethernet frames transmitted within the industrial Ethernet network, an answering Ethernet frame corresponding to the answer for transmission to the host device.

13. The device according to claim 12, wherein the filter function implements one or more of: an EtherType filter, a MAC-address filter, an IP-address filter, or an IP-address-range filter.

14. The device according to claim 12, wherein the device is configured to discontinue use of the filter function after the answer is transmitted to the host device.

15. The device according to claim 10, wherein the device does not need more than two ports for being integrated between the host device and the industrial Ethernet network for exchanging Ethernet frames therewith and injecting the Ethernet frames into the industrial Ethernet network.

16. A method for control and/or monitoring of one or more industrial Ethernet devices in an industrial Ethernet network via an external application running on a host device, the method comprising:
injecting via an industrial Ethernet tunnel device a requesting Ethernet frame for deriving information about the industrial Ethernet network or about one or more of the industrial Ethernet devices; and
receiving an answer in an Ethernet frame format, which answer is transmitted through the industrial Ethernet tunnel device;
wherein the external application is executable to establish a filtering rule in the industrial Ethernet tunnel device which filters out from Ethernet frames transmitted within the industrial Ethernet network an answering Ethernet frame which corresponds to the answer which is to be received in the host device, while the remaining Ethernet frames which are not related to the answer are not transmitted from the industrial Ethernet tunnel device to the host device.

17. The method of claim 16, wherein injecting the requesting Ethernet frame includes converting, by the industrial Ethernet tunnel device, the Ethernet frame format to a format used by the industrial Ethernet network.

18. The method of claim 16, wherein injecting the requesting Ethernet frame includes:
storing, by the industrial Ethernet tunnel device, the requesting Ethernet frame in a buffer storage; and
transmitting the requesting Ethernet frame to the industrial Ethernet network during a feasible time slot.

19. The method of claim 16, wherein receiving the answer includes receiving an answering Ethernet frame selected, using a filter function of the industrial Ethernet tunnel device, from among Ethernet frames transmitted within the industrial Ethernet network.

20. The system of claim 1, wherein the host device is not configured to use a protocol used by the industrial Ethernet network.

* * * * *